(12) United States Patent
Robinson

(10) Patent No.: US 9,486,051 B1
(45) Date of Patent: Nov. 8, 2016

(54) NAIL CLIPPER APPARATUS

(71) Applicant: David Robinson, Atlanta, GA (US)

(72) Inventor: David Robinson, Atlanta, GA (US)

(\*) Notice: Subject to any disclaimer, the term of this patent is extended or adjusted under 35 U.S.C. 154(b) by 0 days.

(21) Appl. No.: 14/951,883

(22) Filed: Nov. 25, 2015

(51) Int. Cl.
*A45D 29/00* (2006.01)
*A45D 29/02* (2006.01)
*G02B 25/00* (2006.01)

(52) U.S. Cl.
CPC ............. *A45D 29/02* (2013.01); *G02B 25/005* (2013.01); *A45D 2029/026* (2013.01)

(58) Field of Classification Search
CPC ........... A45D 29/02; A45D 2029/045; A45D 2029/026; A61B 17/54
USPC ...................................... 30/26, 251, 28, 192
See application file for complete search history.

(56) References Cited

U.S. PATENT DOCUMENTS

| 4,847,994 A | * | 7/1989 | Dunn, Jr. | ............... | A45D 29/02 132/73 |
| 5,357,677 A | | 10/1994 | West | | |
| 5,775,340 A | | 7/1998 | Rains | | |
| 6,539,632 B2 | * | 4/2003 | Anctil | .................... | A45D 29/02 30/131 |

\* cited by examiner

*Primary Examiner* — Kenneth E. Peterson
*Assistant Examiner* — Samuel A Davis
(74) *Attorney, Agent, or Firm* — Crossley & Stevenson Intellectual Property Law

(57) ABSTRACT

A nail clipper apparatus including a nail clipper and a pair of elongated gripping members attachable to each other with a spring loaded hinge. A bottom end of each of a pair of tension rods is mounted to an upper arm of an actuating lever of the nail clipper, and a top end of each of the pair of tension rods is attached to a bottom surface of a lower gripping member of the pair of gripping members. A top side of a push rod is attached to an upper gripping member of the pair of gripping members, and a bottom side of the push rod is slidably disposed atop the upper arm of the actuating lever. Each of an open position and a closed position of the pair of gripping members coincides with an open position and a closed position of the nail clipper.

5 Claims, 5 Drawing Sheets

NAIL CLIPPER APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of nail clippers are known in the prior art. However, what has been needed is a nail clipper apparatus including a nail clipper, a pair of elongated gripping members attachable to each other with a spring loaded hinge, a bottom end of each of a pair of tension rods mounted to an upper surface of an upper arm of an actuating lever of the nail clipper, and a top end of each of the pair of tension rods attached to a bottom surface of a lower gripping member of the pair of gripping members. What has been further needed is a top side of a push rod attached to an upper gripping member of the pair of gripping members, and a bottom side of the push rod slidably disposed atop the upper surface of the upper arm of the actuating lever. A magnifying lens is disposed above the cutting portion of the nail clipper. Each of an open position and a closed position of the pair of gripping members coincides with an open position and a closed position of the nail clipper. A length of the nail clipper is substantially one-third of a length of each of the pair of gripping members. Thus, the nail clipper apparatus eliminates the need for a user to strain his body into an uncomfortable position while clipping his toenails. Furthermore, the nail clipper apparatus provides greater convenience and maneuverability as a result of the pair of elongated gripping members and the magnifying lens.

FIELD OF THE INVENTION

The present invention relates to nail clippers, and more particularly, to a nail clipper apparatus.

SUMMARY OF THE INVENTION

The general purpose of the present nail clipper apparatus, described subsequently in greater detail, is to provide a nail clipper which has many novel features that result in a nail clipper apparatus which is not anticipated, rendered obvious, suggested, or even implied by prior art, either alone or in combination thereof.

To accomplish this, the present nail clipper apparatus includes a nail clipper having an upper arm, a lower arm, and an actuating lever. Each of the upper arm and the lower arm has a cutting portion, an upper surface, a lower surface, a back end opposite the cutting portion, a right edge, and a left edge. The actuating lever has an upwardly facing fin-shaped stopper disposed on an upper surface proximal a back end of the actuating lever. The nail clipper has an open position and an alternate closed position. Each of an upper gripping member of a pair of elongated gripping members and a lower gripping member of a pair of elongated gripping members has a right surface, a left surface, a top surface, and a bottom surface. A spring loaded hinge attaches the upper gripping member with the lower gripping member. A length of the nail clipper is substantially one-third of a length of each of the pair of gripping members.

The nail clipper apparatus further includes a pair of tension rods. The pair of tension rods includes a right tension rod and a left tension rod. Each of the right tension rod and the left tension rod has a top end and a bottom end. The bottom end of each of the right tension rod and the left tension rod is mounted to the upper surface of the upper arm the nail clipper along the back end proximal the right edge and the left edge, respectively, wherein the top end of each of the right tension rod and the left tension rod is attached to the bottom surface of the lower gripping member proximal the front edge. A top side of a push rod is attached to the right surface of the upper gripping member proximal the bottom surface, and a bottom side of the push rod is slidably disposed atop the upper surface of the upper arm of the actuating lever. The bottom side of the push rod is configured to slide across the upper surface of the actuating lever from the back end to the stopper and, alternatively, from the stopper to the back end. A width of the push rod substantially conforms to a width of the fin-shaped stopper.

The pair of gripping members is perpendicularly disposed above the nail clipper and has an open position and an alternate closed position. The pair of gripping members is in the open position when the nail clipper is in the open position and the bottom side of the push rod is disposed atop the upper surface of the actuating lever adjacent to the back end. The pair of gripping members is in the closed position when the nail clipper is in the closed position and the bottom side of the push rod is disposed atop the upper surface of the actuating lever adjacent to the stopper.

A magnifying lens is disposed above the cutting portion of the nail clipper. The magnifying lens has a pair of rearwardly extending arms having a slot disposed between each of the pair of arms. The pair of tension rods and the push rod are disposed within the slot. A width of the slot substantially conforms to the width of the push rod. An adjustment screw is attachable to a rear edge of each of the pair of arms. The adjustment screw is configured to tighten the pair of arms around the pair of tension rods and the push rod in order to hold the magnifying lens in place above the cutting portion of the nail clipper.

The nail clipper apparatus optionally includes a locking clasp, a pair of rubberized covers, and a pair of triangulated attachments. The locking clasp has a top area and a bottom area. The top area of the locking clasp is hingedly attached to the right surface of the upper gripping member proximal the top side of the push rod, and the bottom area of the locking clasp is selectively engageable around a circular clasp disposed on the right surface of the lower gripping member proximal the top end of each of the tension rods. Each of the pair of covers has a front side. A first of the pair of covers is continuously disposed around the upper gripping member from a rear side of the upper gripping member to proximal the top side of the push rod, and a second of the pair of covers is continuously disposed around the lower gripping member from a rear side of the lower gripping member to proximal the top end of each of the tension rods. The pair of attachments includes an upwardly facing upper attachment and a downwardly facing lower attachment. The upper attachment is disposed atop the first of the pair of covers adjacent to the front side, and the lower attachment is disposed on the second of the pair of covers proximal the front side.

Thus has been broadly outlined the more important features of the present tool storage box with a magnetic sheet so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 5 thereof, an example of the instant nail clipper apparatus employing the principles and concepts of the present nail clipper apparatus and generally designated by the reference number 10 will be described.

Figure 4:
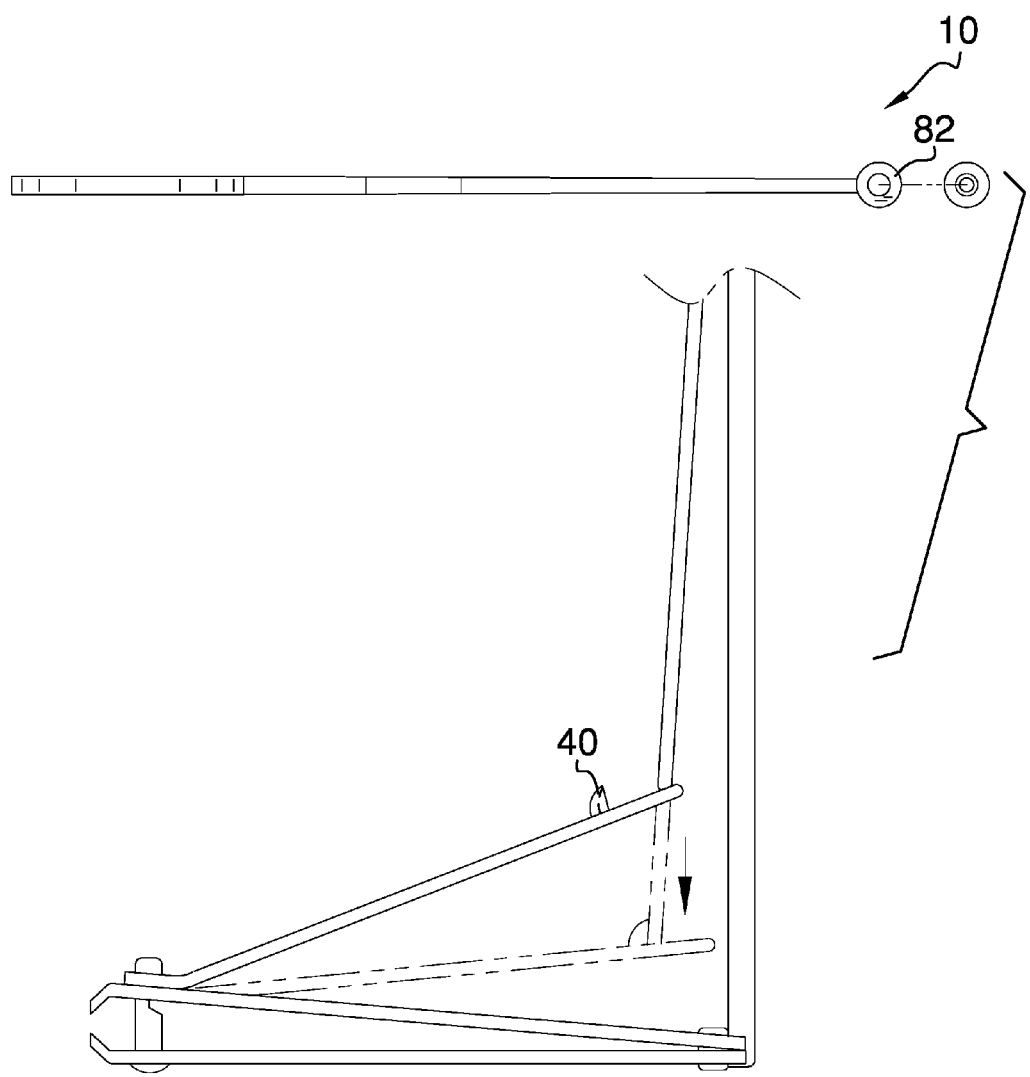
FIG. 4 is a detail view an upper arm and a lower arm of an actuating lever of a nail clipper.
Figure 5:
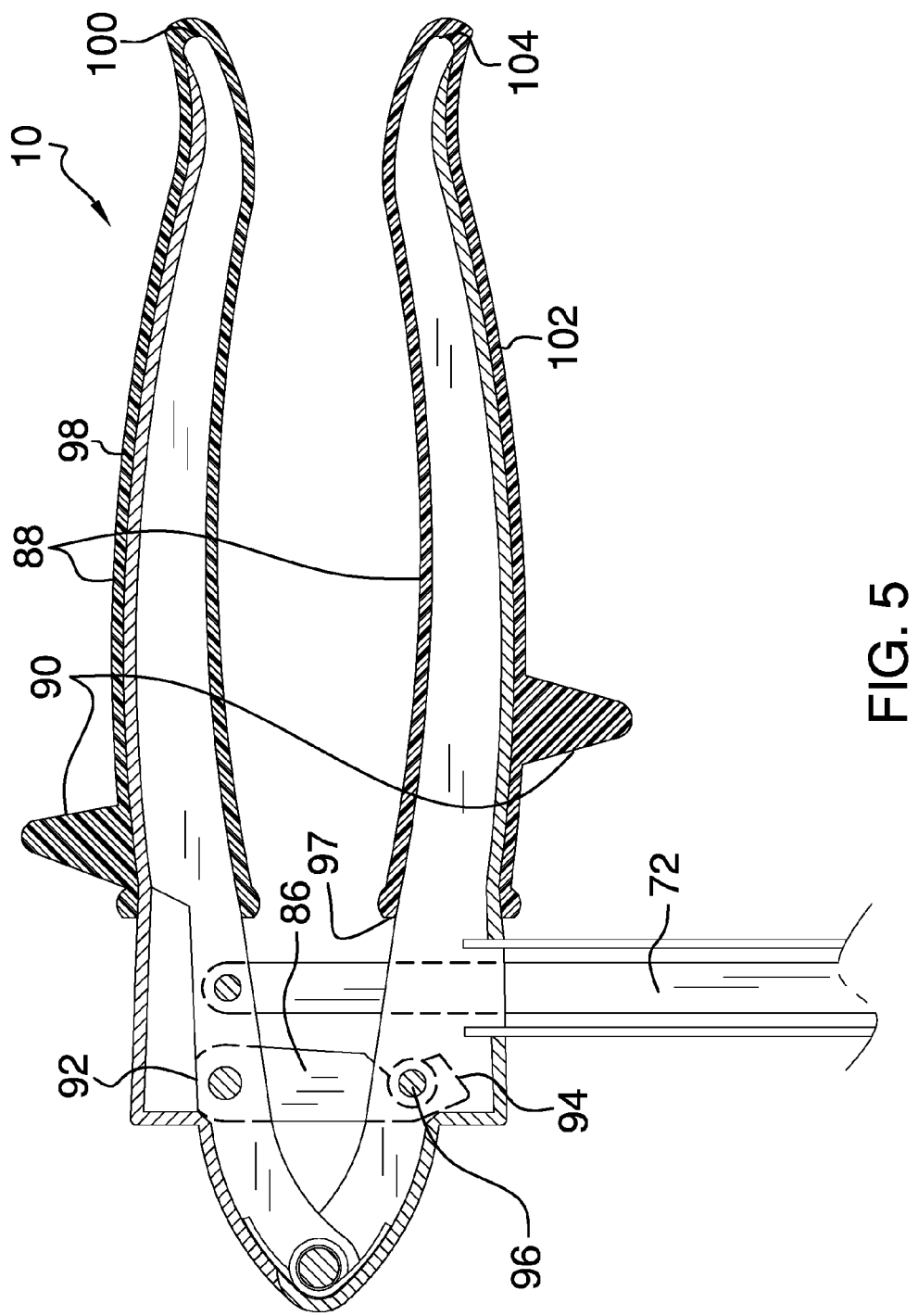
FIG. 5 is a cross-sectional view taken along line 5-5 of FIG. 3.

Referring to FIGS. 1 through 5 the present nail clipper apparatus 10 is illustrated. The nail clipper apparatus 10 includes a nail clipper 20 an upper arm 26, a lower arm 28, and an actuating lever 24. Each of the upper arm 26 and the lower arm 28 has a cutting portion 22, an upper surface 30, a lower surface 32, a back end 34 opposite the cutting portion 22, a right edge 36, and a left edge 38. The actuating lever 24 has an upwardly facing fin-shaped stopper 40 disposed on an upper surface 30 proximal a back end 34 of the actuating lever 24. As best shown in FIG. 4, the nail clipper 20 has an open position and an alternate closed position. Each of an upper gripping member 42 of a pair of elongated gripping members and a lower gripping member 46 of a pair of elongated gripping members has a right surface 48, a left surface 50, a top surface 52, and a bottom surface 54. A spring loaded hinge 56 attaches the upper gripping member 42 with the lower gripping member 46. The pair of gripping members is encased by a convexly curved front edge 58.

The nail clipper apparatus 10 further includes a pair of tension rods 60. The pair of tension rods 60 includes a right tension rod 62 and a left tension rod 64. Each of the right tension rod 62 and the left tension rod 64 has a top end 66 and a bottom end 68. The bottom end 68 of each of the right tension rod 62 and the left tension rod 64 is mounted to the upper surface 30 of the upper arm 26 of the nail clipper 20 along the back end 34 proximal the right edge 36 and the left edge 38, respectively, wherein the top end 66 of each of the right tension rod 62 and the left tension rod 64 is attached to the bottom surface 54 of the lower gripping member 46 proximal the front edge 58. A top side 70 of a push rod 72 is attached to the right surface 48 of the upper gripping member 42 proximal the bottom surface 54, and a bottom side 74 of the push rod 72 is slidably disposed atop the upper surface 30 of the actuating lever 24. The bottom side 74 of the push rod 72 is configured to slide across the upper surface 30 of the actuating lever 24 from the back end 34 to the stopper 40 and, alternately, from the stopper 40 to the back end 34.

Figure 1:
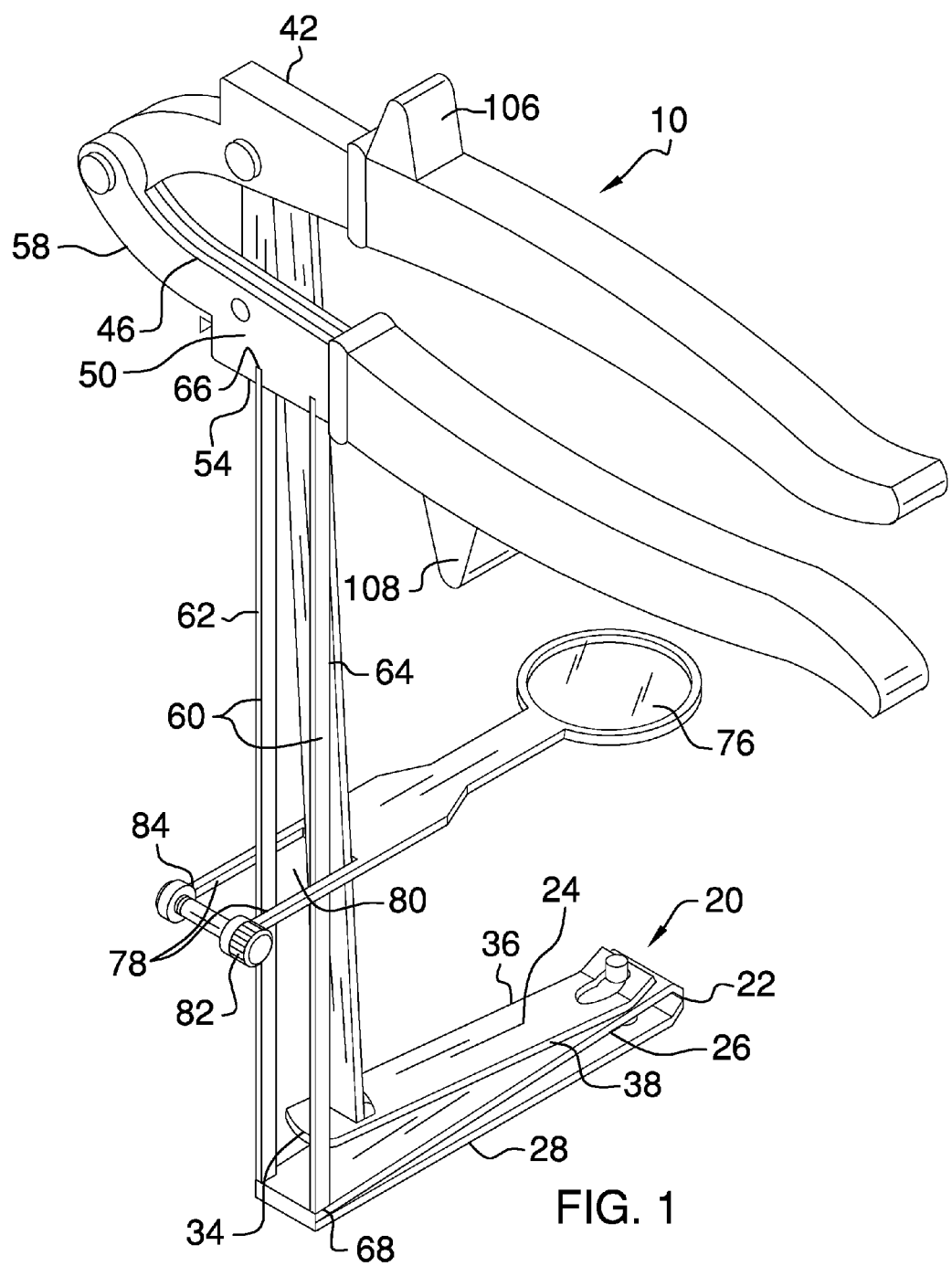
FIG. 1 is a rear isometric view.
Figure 2:
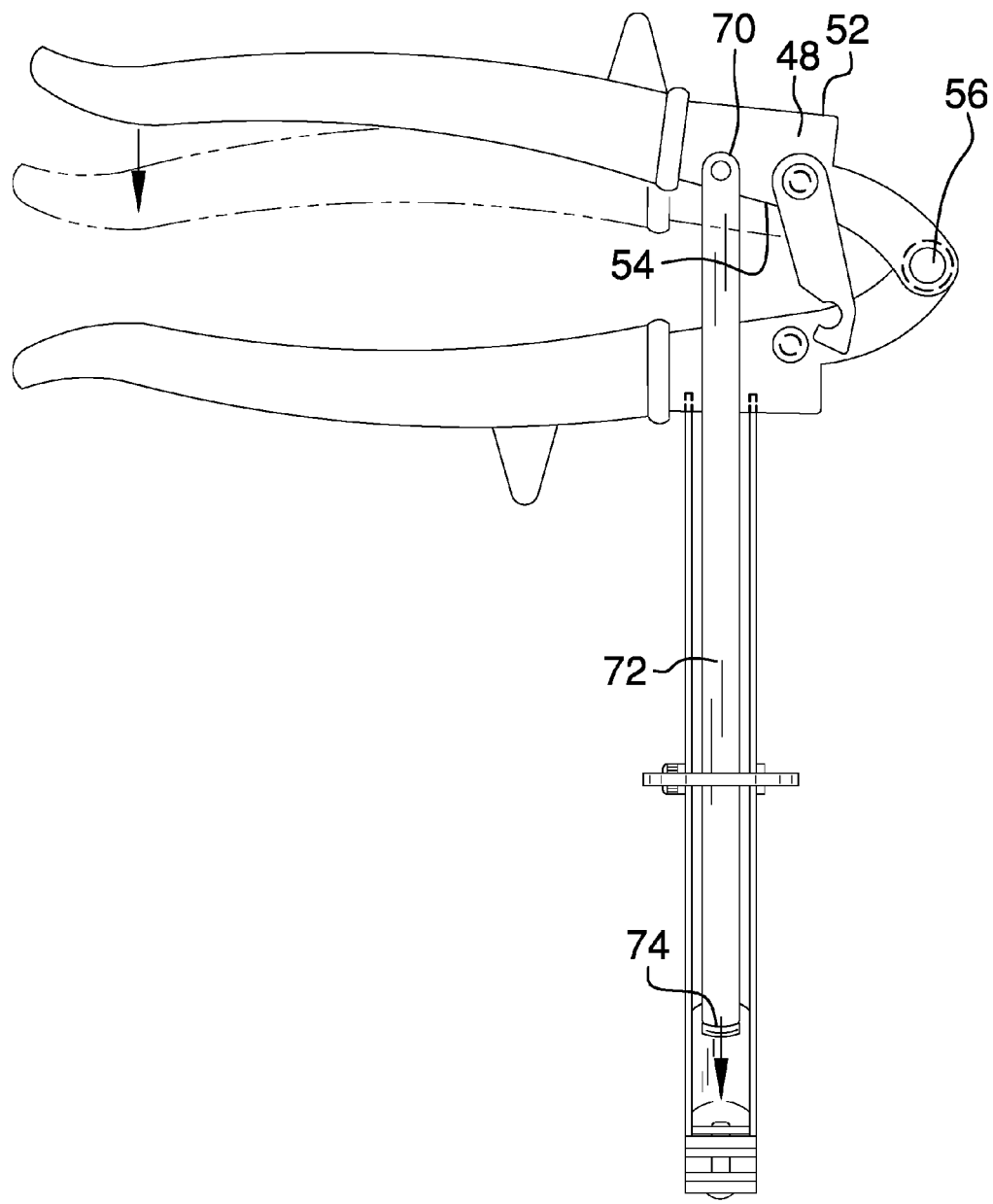
FIG. 2 is a front elevation view.
Figure 3:
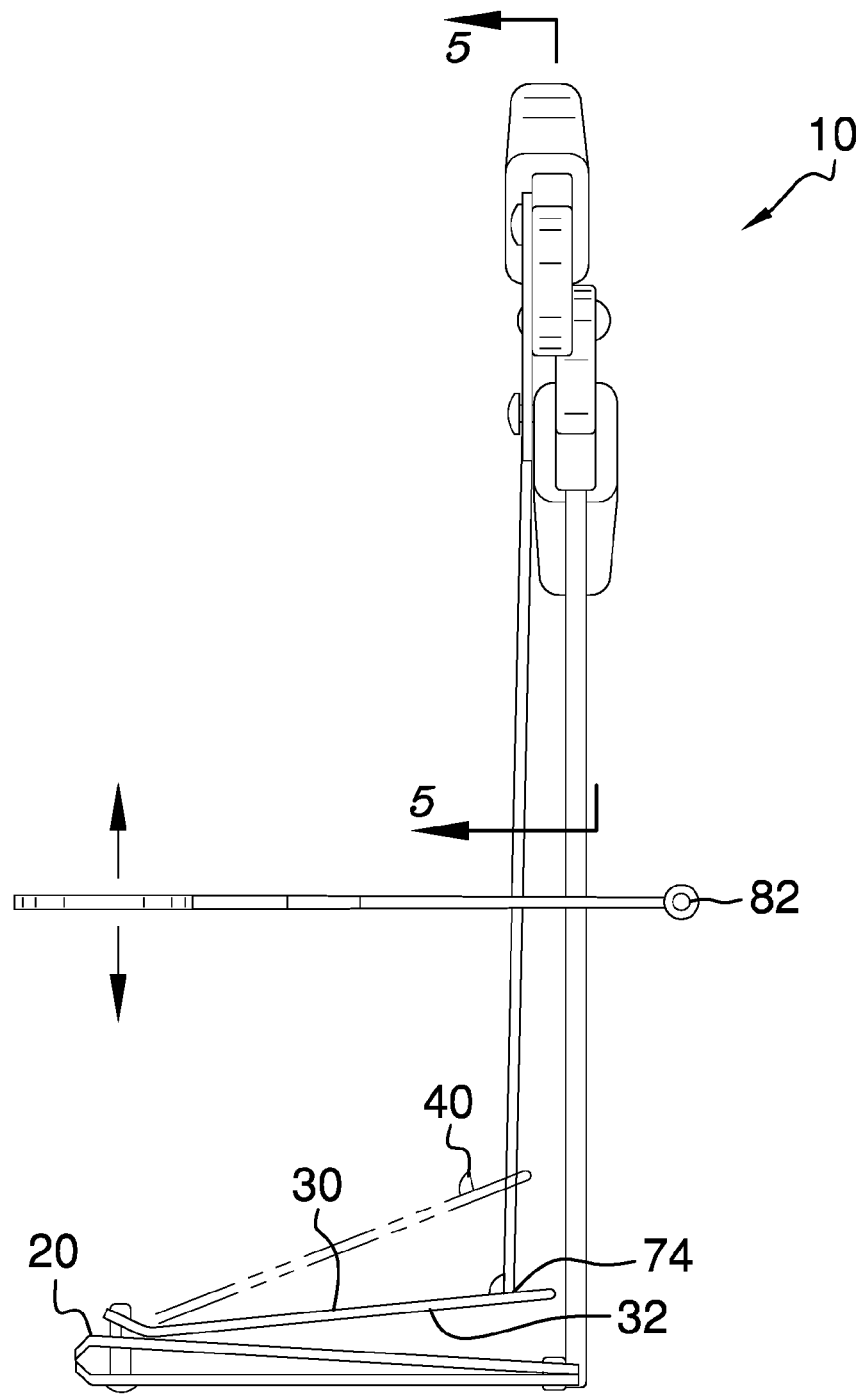
FIG. 3 is a side elevation view.

As best shown in FIG. 2, the pair of gripping members is perpendicularly disposed above the nail clipper 20 and has an open position and an alternate closed position. The pair of gripping members is in the open position when the nail clipper 20 is in the open position and the bottom side 74 of the push rod 72 is disposed atop the upper surface 30 of the upper arm 26 of the actuating lever 24 adjacent to the back end 34. The pair of gripping members is in the closed position when the nail clipper 20 is in the closed position and the bottom side 74 of the push rod 72 is disposed atop the upper surface 30 of the upper arm 26 of the actuating lever 24 adjacent to the stopper 40.

A magnifying lens 76 is disposed above the cutting portion 22 of the nail clipper 20. The magnifying lens 76 has a pair of rearwardly extending arms 78 having a slot 80 disposed between each of the pair of arms 78. The pair of tension rods 60 and the push rod 72 are disposed within the slot 80. An adjustment screw 82 is attachable to a rear edge 84 of each of the pair of arms 78.

The nail clipper apparatus 10 optionally includes a locking clasp 86, a pair of rubberized covers 88, and a pair of triangulated attachments 90. The locking clasp 86 has a top area 92 and a bottom area 94. The top area 92 of the locking clasp 86 is hingedly attached to the right surface 48 of the upper gripping member 42 proximal the top side 70 of the push rod 72, and the bottom area 94 of the locking clasp 86 is selectively engageable around a circular clasp 96 disposed on the right surface 48 of the lower gripping member 46 proximal the top end 66 of each of the tension rods 60. Each of the pair of covers 88 has a front side 97. A first 98 of the pair of covers 88 is continuously disposed around the upper gripping member 42 from a rear side 100 of the upper gripping member 42 to proximal the top side 70 of the push rod 72, and a second 102 of the pair of covers 88 is continuously disposed around the lower gripping member 46 from a rear side 104 of the lower gripping member 46 to proximal the top end 66 of each of the pair of tension rods 60. The pair of attachments 90 includes an upwardly facing upper attachment 106 and a downwardly facing lower attachment 108. The upper attachment 106 is disposed atop the first 98 of the pair of covers 88 adjacent to the front side 96, and the lower attachment 108 is disposed on the second 102 of the pair of covers 88 proximal the front side 96.

What is claimed is:

1. A nail clipper apparatus comprising:
   a nail clipper comprising an upper arm and a lower arm, each of the upper arm and the lower arm having a cutting portion, an upper surface, a lower surface, a back end opposite the cutting portion, a right edge, and a left edge, the nail clipper further comprising an actuating lever with an upwardly facing fin-shaped stopper disposed on an upper surface of the actuating lever proximal a back end thereof, wherein the nail clipper has an open position and an alternate closed position;
   a pair of elongated gripping members comprising an upper gripping member and a lower gripping member, each of the upper gripping member and the lower gripping member having a right surface, a left surface, a top surface, and a bottom surface, wherein a spring loaded hinge attaches the upper gripping member with the lower gripping member;
   wherein a length of the nail clipper is substantially one-third of a length of each of the pair of gripping members;
   a pair of tension rods comprising a right tension rod and a left tension rod, each of the right tension rod and the left tension rod having a top end and a bottom end, wherein the bottom end of each of the right tension rod and the left tension rod is mounted to the upper surface of the upper arm of the nail clipper along the back end proximal the right edge and the left edge, respectively, wherein the top end of each of the right tension rod and the left tension rod is attached to the bottom surface of the lower gripping member proximal the front edge;

a push rod having a top side and a bottom side, wherein the top side is attached to the upper gripping member right surface proximal the bottom surface, and the bottom side is slidably disposed atop the upper surface of the actuating lever, wherein the bottom side is configured to slide across the upper surface of the actuating lever from the back end to the stopper and, alternately, from the stopper to the back end wherein a width of the push rod substantially conforms to a width of the fin-shaped stopper, wherein the pair of gripping members is perpendicularly disposed above the nail clipper;

wherein the pair of gripping members has an open position and an alternate closed position;

wherein the pair of gripping members is in the open position when the nail clipper is in the open position and the push rod bottom side is disposed atop the upper surface of the actuating lever adjacent to the back end;

wherein the pair of gripping members is in the closed position when the nail clipper is in the closed position and the push rod bottom side is disposed atop the upper surface of the actuating lever adjacent to the stopper a magnifying lens disposed above the nail clipper cutting portion, the magnifying lens having a pair of rearwardly extending arms having a slot disposed between each of the pair of arms, wherein the pair of tension rods and the push rod are disposed within the slot, wherein a width of the slot substantially conforms to the width of the push rod; and an adjustment screw attachable to a rear edge of each of the pair of arms, wherein the adjustment screw is configured to tighten the pair of arms around the pair of tension rods and the push rod in order to hold the magnifying lens in place above the nail clipper cutting portion.

2. The nail clipper apparatus of claim 1 further comprising a locking clasp having a top area and a bottom area, wherein the top area is hingedly attached to the upper gripping member right surface proximal the push rod top side, and the bottom area is selectively engageable around a circular clasp disposed on the lower gripping member right surface proximal the top end of each of the tension rods.

3. The nail clipper apparatus of claim 1 further comprising a pair of rubberized covers, each of the pair of covers having a front side, wherein a first of the pair of covers is continuously disposed around the upper gripping member from a rear side of the upper gripping member to proximal the push rod top side, and a second of the pair of covers is continuously disposed around the lower gripping member from a rear side of the lower gripping member to proximal the top end of each of the pair of tension rods.

4. The nail clipper apparatus of claim 3 further comprising a pair of triangulated attachments comprising an upwardly facing upper attachment and a downwardly facing lower attachment, wherein the upper attachment is disposed atop the first of the pair of covers adjacent to the front side, and the lower attachment is disposed on the second of the pair of covers proximal the front side.

5. A nail clipper apparatus comprising:

a nail clipper comprising an upper arm and a lower arm, each of the upper arm and the lower arm having a cutting portion, an upper surface, a lower surface, a back end opposite the cutting portion, a right edge, and a left edge, the nail clipper further comprising an actuating lever with an upwardly facing fin-shaped stopper disposed on an upper surface of the actuating lever proximal a back end thereof, wherein the nail clipper has an open position and an alternate closed position;

a pair of elongated gripping members comprising an upper gripping member and a lower gripping member, each of the upper gripping member and the lower gripping member having a right surface, a left surface, a top surface, and a bottom surface, wherein a spring loaded hinge attaches the upper gripping member with the lower gripping member;

wherein a length of the nail clipper is substantially one-third of a length of each of the pair of gripping members;

a pair of tension rods comprising a right tension rod and a left tension rod, each of the right tension rod and the left tension rod having a top end and a bottom end, wherein the bottom end of each of the right tension rod and the left tension rod is mounted to the upper surface of the upper arm of the nail clipper along the back end proximal the right edge and the left edge, respectively, wherein the top end of each of the right tension rod and the left tension rod is attached to the bottom surface of the lower gripping member proximal the front edge;

a push rod having a top side and a bottom side, wherein the top side is attached to the upper gripping member right surface proximal the bottom surface, and the bottom side is slidably disposed atop the upper surface of the actuating lever, wherein the bottom side is configured to slide across the upper surface of the actuating lever from the back end to the stopper and, alternately, from the stopper to the back end wherein a width of the push rod substantially conforms to a width of the fin-shaped stopper, wherein the pair of gripping members is perpendicularly disposed above the nail clipper;

wherein the pair of gripping members has an open position and an alternate closed position;

wherein the pair of gripping is in the open position when the nail clipper is in the open position and the push rod bottom side is disposed atop the upper surface of the actuating lever adjacent to the back end;

wherein the pair of gripping members is in the closed position when the nail clipper is in the closed position and the push rod bottom side is disposed atop the upper surface of the actuating lever adjacent to the stopper a magnifying lens disposed above the nail clipper cutting portion, the magnifying lens having a pair of rearwardly extending arms having a slot disposed between each of the pair of arms, wherein the pair of tension rods and the push rod are disposed within the slot, wherein a width of the slot substantially conforms to the width of the push rod;

an adjustment screw attachable to a rear edge of each of the pair of arms, wherein the adjustment screw is configured to tighten the pair of arms around the pair of tension rods and the push rod in order to hold the magnifying lens in place above the nail clipper cutting portion;

a locking clasp having a top area and a bottom area, wherein the top area is hingedly attached to the upper gripping member right surface proximal the push rod top side, and the bottom area is selectively engageable around a circular clasp disposed on the lower gripping member right surface proximal the top end of each of the tension rods;

a pair of rubberized covers, each of the pair of covers having a front side, wherein a first of the pair of covers is continuously disposed around the upper gripping member from a rear side of the upper gripping member to proximal the push rod top side, and a second of the pair of covers is continuously disposed around the lower gripping member from a rear side of the lower gripping member to proximal the top end of each of the pair of tension rods; and a pair of triangulated attachments comprising an upwardly facing upper attachment and a downwardly facing lower attachment, wherein the upper attachment is disposed atop the first of the pair of covers adjacent to the front side, and the lower attachment is disposed on the second of the pair of covers proximal the front side.

\* \* \* \* \*